(12) United States Patent
Webb et al.

(10) Patent No.: US 9,183,375 B2
(45) Date of Patent: Nov. 10, 2015

(54) USE OF RESOURCE UP TO EXTENSION VALUE BY SUBSCRIPTION DEVICE

(71) Applicant: HEWLETT-PACKARD DEVELOPMENT COMPANY, Fort Collins, CO (US)

(72) Inventors: Rowdy K. Webb, Vancouver, WA (US); Laurent Pizot, Vancouver, WA (US); Shawn C. Kennedy, Vancouver, WA (US); Jefferson P. Ward, Vancouver, WA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 11 days.

(21) Appl. No.: 13/754,282

(22) Filed: Jan. 30, 2013

(65) Prior Publication Data

US 2014/0215584 A1    Jul. 31, 2014

(51) Int. Cl.
*H04L 29/00*    (2006.01)
*G06F 21/42*    (2013.01)
*H04L 29/06*    (2006.01)

(52) U.S. Cl.
CPC .............. *G06F 21/42* (2013.01); *H04L 63/083* (2013.01)

(58) Field of Classification Search
CPC .................................. H04L 9/00; G06F 21/31
See application file for complete search history.

(56) References Cited

U.S. PATENT DOCUMENTS

| | | | |
|---|---|---|---|
| 5,383,129 A | 1/1995 | Farrell | |
| 5,495,411 A * | 2/1996 | Ananda | 705/32 |
| 6,603,975 B1 | 8/2003 | Inouchi et al. | |
| 6,650,433 B1 | 11/2003 | Keane et al. | |
| 6,712,266 B2 | 3/2004 | Bartley et al. | |
| 6,801,333 B1 | 10/2004 | Weiss | |
| 6,854,839 B2 | 2/2005 | Collier et al. | |
| 7,043,523 B2 | 5/2006 | Haines et al. | |
| 7,065,497 B1 | 6/2006 | Brewster et al. | |
| 7,113,299 B2 | 9/2006 | Suzuki et al. | |
| 7,136,177 B1 | 11/2006 | Bryan et al. | |
| 7,319,535 B2 | 1/2008 | Cherry et al. | |
| 7,526,555 B2 | 4/2009 | Shahindoust | |
| 7,545,528 B2 | 6/2009 | Takabayashi et al. | |
| 7,660,539 B2 | 2/2010 | Tye et al. | |

(Continued)

FOREIGN PATENT DOCUMENTS

| | | |
|---|---|---|
| KR | 1020020012299 A | 2/2002 |
| KR | 1020020079446 A | 10/2002 |

(Continued)

OTHER PUBLICATIONS

Kalochristianakis, M. et al., The Concept and Design of an Open, Integrated Print Charging System, (Research Paper), 15th Panhellenic Conference on Informatics, Sep. 30-Oct. 2, 2011, pp. 292-296.

(Continued)

*Primary Examiner* — Michael D. Anderson
(74) *Attorney, Agent, or Firm* — Mahamedi Paradice LLP

(57) ABSTRACT

A pin associated with an identification number (ID) of a subscription device and a sequence number of a credit is output to a user. The pin is inputted to the subscription device. The subscription device is to allow the user to use a resource up to an extension value stored in the subscription device, if the entered pin correlates to a stored pin of the subscription device.

13 Claims, 4 Drawing Sheets

(56) References Cited

U.S. PATENT DOCUMENTS

| | | |
|---|---|---|
| 7,765,580 B2 * | 7/2010 | Vandergeest et al. ............. 726/2 |
| 8,051,012 B2 | 11/2011 | Ramanathan et al. |
| 8,296,202 B2 | 10/2012 | Matsuda et al. |
| 2002/0131079 A1 | 9/2002 | Forbes et al. |
| 2002/0152183 A1 | 10/2002 | Soares et al. |
| 2002/0165833 A1 | 11/2002 | Minowa et al. |
| 2003/0011809 A1 | 1/2003 | Suzuki et al. |
| 2003/0074312 A1 | 4/2003 | White |
| 2003/0078863 A1 | 4/2003 | Pilu |
| 2003/0187808 A1 | 10/2003 | Alfred et al. |
| 2004/0056889 A1 | 3/2004 | Katano |
| 2004/0138945 A1 | 7/2004 | Adkins et al. |
| 2004/0196491 A1 | 10/2004 | Uchino |
| 2004/0201613 A1 | 10/2004 | Foster et al. |
| 2004/0215580 A1 | 10/2004 | Pilu et al. |
| 2005/0289054 A1 | 12/2005 | Silverbrook et al. |
| 2006/0069615 A1 | 3/2006 | Gupta |
| 2006/0074816 A1 | 4/2006 | Hibara et al. |
| 2006/0271424 A1 | 11/2006 | Gava et al. |
| 2007/0188530 A1 | 8/2007 | Garrana et al. |
| 2007/0283447 A1 | 12/2007 | Hong et al. |
| 2008/0310875 A1 | 12/2008 | Rahman et al. |
| 2009/0016743 A1 | 1/2009 | Tye et al. |
| 2009/0016748 A1 | 1/2009 | Ferlitsch |
| 2009/0030837 A1 | 1/2009 | Knodt |
| 2009/0070243 A1 | 3/2009 | Buck et al. |
| 2009/0089192 A1 | 4/2009 | Ferlitsch |
| 2009/0265286 A1 | 10/2009 | Nagarajan |
| 2010/0053673 A1 | 3/2010 | Oba |
| 2011/0220711 A1 | 9/2011 | Hendley et al. |
| 2011/0235113 A1 | 9/2011 | Ohara |
| 2012/0203618 A1 | 8/2012 | Roever |
| 2012/0307263 A1 | 12/2012 | Ichikawa et al. |
| 2012/0327449 A1 | 12/2012 | Lee |
| 2013/0006871 A1 * | 1/2013 | Stefik et al. ..................... 705/59 |
| 2013/0010333 A1 | 1/2013 | Anand et al. |
| 2013/0073391 A1 | 3/2013 | Young |
| 2013/0110744 A1 | 5/2013 | Hendley et al. |
| 2014/0355029 A1 | 12/2014 | Mccoog |

FOREIGN PATENT DOCUMENTS

| | | |
|---|---|---|
| KR | 100812694 B1 | 3/2008 |
| WO | WO-0076204 A1 | 12/2000 |
| WO | WO-0102946 A1 | 1/2001 |
| WO | WO-0102948 A1 | 1/2001 |
| WO | WO-0184429 A1 | 11/2001 |
| WO | WO-2010056739 A2 | 5/2010 |
| WO | WO-2011115987 A2 | 9/2011 |
| WO | WO-2015012824 A1 | 1/2015 |

OTHER PUBLICATIONS

International Search Report & Written Opinion received in PCT Application No. PCT/US2013/051855, Apr. 29, 2014, 15 pages.

Staples, "Price List," Copy and Print, Jan. 17, 2009, <http://web.archive.org/web/20090117091458/http://www.staplescopyandprint.ca/Downloads/BrochureENG_oncelist.pdf> (4 pages).

Wikipedia, "Digital wallet," Jul. 21, 2009, <http://web.archive.org/web/20090721024634/http://en.wikipedia.org/wiki/Digital_wallett>.

Wikipedia, "Electronic bill payment," Aug. 5, 2009, <http://web.archive.org/web/20090805062547/http://en.wikipedia.org/wiki/Electronic_bill_payment> (2 pages).

Wikipedia, "Electronic money," May 3, 2009, <http://web.archive.org/web/20090503070004/http://en.wikipedia.org/wiki/Electronic_money>.

Wikipedia, "PayPal," Oct. 16, 2009, <http://web.archive.org/web/20091016145237/http://en.wikipedia.org/wiki/PayPal> (7 pages).

Wikipedia, "Prepaid mobil phone," Nov. 12, 2009, <http://web.archive.org/web/20091112171924/http://en.wikipedia.org/wiki/Prepaid_mobile_phone>.

Xerox, "Xerox eConcierge Supplies Assistant Technical Information," 2012, available at https://www.xeroxdirect.ca/include/XDEFS-01C.PDF (4 pages).

* cited by examiner

USE OF RESOURCE UP TO EXTENSION VALUE BY SUBSCRIPTION DEVICE

BACKGROUND

User devices may subscribe to a service over a network from a provider. The service may allow the device to use a resource locally according to a subscription plan. Providers are challenged to provide their services in a reliable and uninterrupted manner to the user device over the network while maintaining security and ease of use.

BRIEF DESCRIPTION OF THE DRAWINGS

The following detailed description references the drawings, wherein.

DETAILED DESCRIPTION

Figure 1:
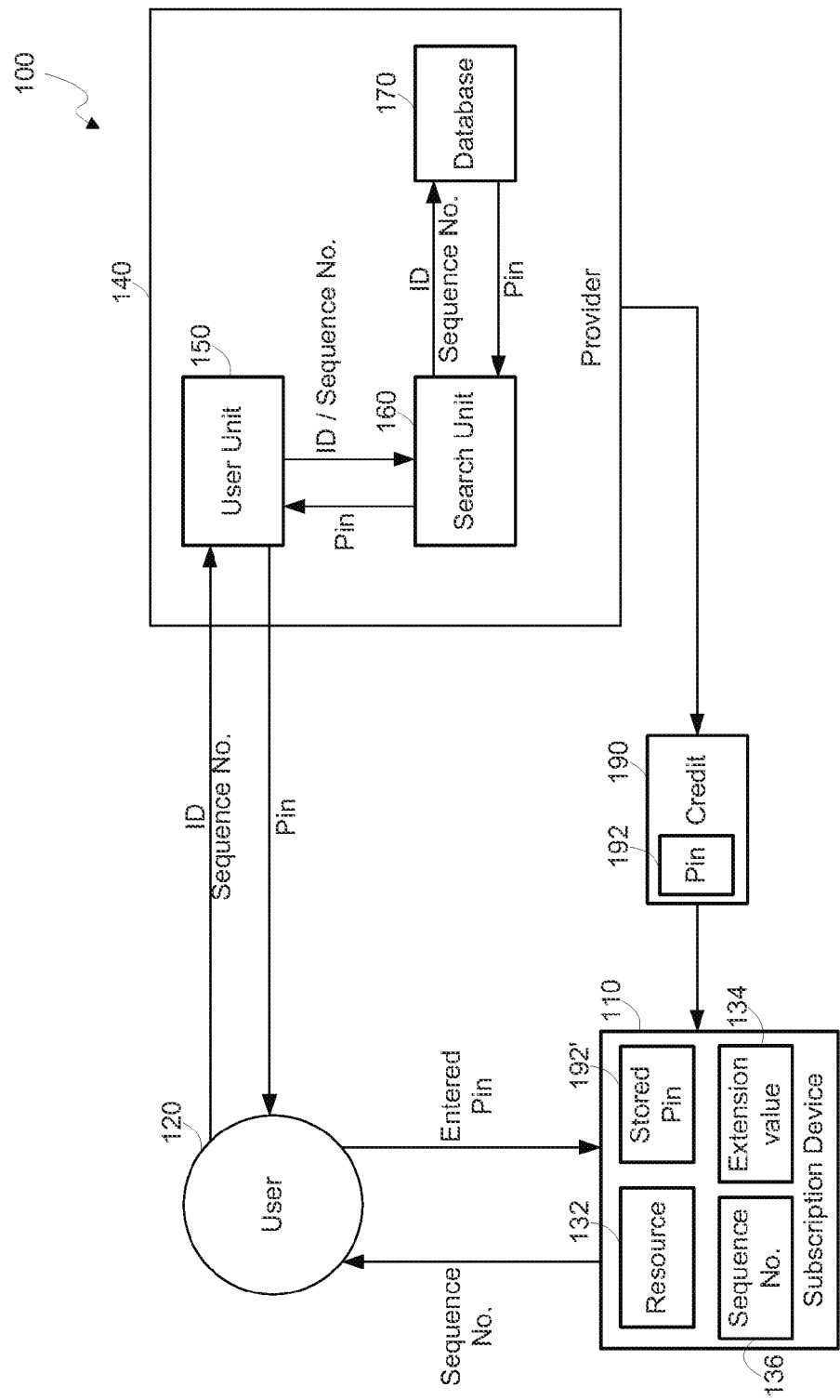
FIG. 1 is an example block diagram of a system for allowing a subscription device to use a resource up to an extension value.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Subscription to services over a network by user devices is becoming more prevalent with advances in technology. Such subscriptions may provide credits having a quantifiable value to the user device over the network. In turn, the user device may use the credits to buy and/or consume a local resource. For example, a provider may provide a printing service to a user device, such as a printer, where each credit may allow the printer to print a specified number of pages, such as 500 pages per credit. In this scenario, ink for the printer may be included in the subscription fee. For example, the provider may monitor ink levels at the printer and send new ink cartridges when ink levels become low, such as every 3 to 24 months.

However, if the user device encounters issues connecting to the provider, such as due to network issues, then the user device may not be able to receive the credits from the provider and may run out of credits. For example, if a 500 page credit is dropped due to network issues and the printer uses up all of its existing print credit allowance in the meantime, then the printer may not be able to print any more pages despite still being entitled to 500 additional pages. Further, a user may not be able to wait for the network connection to be resolved due to a time sensitive nature of a print job. Thus, this may result in user dissatisfaction and loss of business for the provider, even if the provider is not at fault for the network connection issues.

Embodiments allow for a subscription device, such as a printer, to consume a resource, such as printer pages, beyond its subscribed limit, when there is a network issue, while maintaining security. For example, in one embodiment, a system may include a user unit and a search unit. The user unit may receive an identification number (ID) and a sequence number from a user. The ID number may correspond to a subscription device of the user and the sequence number may correspond to a credit last received by the subscription device via a network connection. The search unit may search a database for a pin associated with the ID number and the sequence number. The user unit may output the pin to the user and the user may enter the pin into the subscription device. The subscription device may compare the entered pin with a pin stored in the subscription device, where the stored pin is retrieved from a pin field included in the last received credit. Then, the subscription device may allow the user to use a resource up to an extension value stored in the subscription device, if the entered pin correlates to the stored pin.

Thus, in the event that the subscription device is unable to receive additional credits due to network issues and the subscription device has already maxed out the resources allotted by the previously received one or more credits, embodiments provide an alternate mechanism for the user to be allotted additional resources. In addition, embodiments are able to provide the additional resources in a secure manner by leveraging information retrieved from the credit last received by the subscription device to authenticate the user. Also, by authenticating the user beforehand, embodiments are able to provide a pin to the user that is relatively short and easy to input. Moreover, embodiments may be able to provide the above alternate mechanism without substantially modifying the subscription device, thus providing a low cost solution while keeping the user satisfied with the provider's service.

Referring now to the drawings, FIG. 1 is an example block diagram of a system 100 for allowing a subscription device 110 to use a resource 132 up to an extension value 134. The system 100 includes the subscription device 110 and a provider 140. The subscription device 110 may be any type of device capable of receiving a credit 190 over a network connection, such as a printer, fax machine, mobile device, computer, and the like. For example, the subscription device 110 may include a memory (not shown) for storing data, the credit 190 and/or instructions and a processor (not shown) to execute instructions. The credit 190 may be any type of packet sent by the provider 140 to the subscription device 110.

The provider 140 may be any type of entity that provides a service, such as an application service provider (ASP), a network service provider (NSP), an internet service provider (ISP), a managed service provider (MSP), a storage service provider (SSP), a manufacturer of the subscription device 110, a telecommunications service provider (TSP), and the like. The term network connection may refer to any type of interface capable of establishing a link between the subscription device 110 and the provider 140, such as Local Area Networks, (LAN), dial-up access, broadband access, cable Internet access, satellite, digital subscriber line (DSL, ADSL, SDSL, and VDSL), Wi-Fi, and the like.

As explained above, the provider 140 may provide a subscription for a resource 132, with the credit 190 to indicate an amount of the resource accumulated at a given time. Even though a single credit 190 is shown in FIG. 1, the provider 140 may provide a plurality of credits 190 over at different intervals of times, such as one credit 190 per month. The resource 132 may relate to any type of service and/or product being used by the subscription device 110, such pages of paper, volume of ink, amount of time the subscription device 110 may be on, a number of accesses allowed by the subscription device 110 to content or a service, and the like. For instance, if the subscription relates to a monthly subscription for printing, the provider 140 may send a credit 190 every month to the subscription device 110 indicating a total amount of pages available to the subscription device 110 at a given time. For example, if the monthly quota is 500 pages, the credit 190 may indicate 500 the first month, 1000 the second month, 1500 the third month, and so on.

The provider 140 is shown to include a user unit 150, a search unit 160 and a database 170. The user unit 150 and search unit 160 may include, for example, a hardware device including electronic circuitry for implementing the functionality described below, such as control logic and/or memory. In addition or as an alternative, the user unit 150 and search unit 160 may be implemented as a series of instructions encoded on a machine-readable storage medium and executable by a processor. The database 170 may include any type of non-volatile memory for storing user data, such as a hard disk drive (HDD).

The user unit 150 is to receive an identification number (ID) and a sequence number 136 from a user 120. The ID number may correspond to the subscription device 110 of the user 120. For example, the ID number may be a value that uniquely identifies the subscription device 110 to the provider 140, such as a serial number. The sequence number 136 may correspond to a credit 190 last received by the subscription device 110 via a network connection. For example, the subscription device 110 may receive a plurality of credits 190, with each of the credits 190 having a different sequence number that uniquely identifies each of the credits 190.

As a network connection between the subscription device 110 and the provider 140 may not be functioning properly, the user 150 may use a separate connection to transmit the ID number and sequence number to the user unit 150. In one embodiment, the user 120 may use a different device and/or network, such as telecommunication device or computer. For example, the user 120 may call the provider 140 using a phone via a different network or contact the provider 140 using a web browser via the same network (but different network connection) as that of the subscription device 110.

The search unit 160 is to search a database 170 for a pin associated with the provided ID number and sequence number. For example, the database 170 may store a unique pin for different combinations of ID and sequence numbers. If no pin correlates to the set of ID number and sequence number provided, the database 170 may indicate that an improper parameter has been entered, such as by returning a null value. Assuming the pin is found, the user unit 150 may output the pin to the user 120 via the separate connection. The user 120 may then enter the pin into the subscription device 110.

The subscription device 110 may next compare the entered pin with a pin 192' stored in the subscription device 110, where the stored pin 192' is retrieved from a pin field 192 included in the credit 190 last received by the subscription device 110. If the entered pin correlates to the stored pin 192', the subscription device 110 allows the user 120 to use the resource 132 up to an extension value 134 stored in the subscription device 110.

Thus, a situation may arise where the subscription device 110 is unable to able use to the resource 132 due to being out of credits 190 and also not being able to receive additional credits 190, such as because of network issues between the subscription device 110 and the provider 140. However, embodiments may also allow a user 120 to contact the provider 140 through the separate connection to receive the pin, where the pin allows the user 120 to immediately use the resource 132 up to the extension value 134 via the subscription device 110, despite the network issues.

Figure 2:
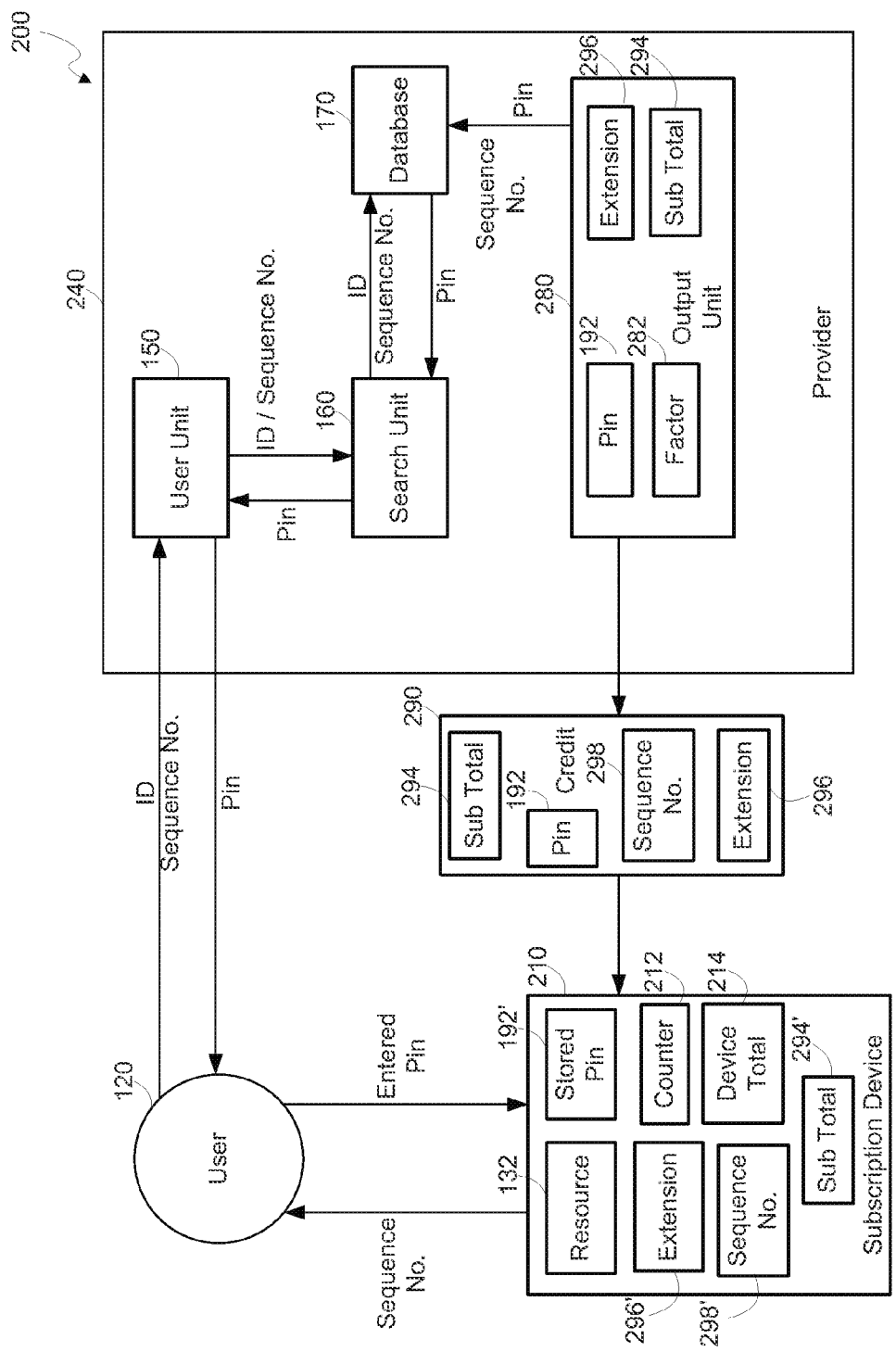
FIG. 2 is another example block diagram of a system for allowing a subscription device to use a resource up to an extension value.

FIG. 2 is another example block diagram of a system 200 for allowing a subscription device 210 to use a resource 132 up to an extension value 296'. The system 200 includes the subscription device 210 and a provider 240. The subscription device 210 and provider 240 of FIG. 2 may respectively include at least the functionality and/or hardware of the subscription device 110 and provider 140 of FIG. 1.

For instance, the customer unit 150, search unit 160 and database 170 included in the provider 240 of FIG. 2 may respectively include the functionality of the customer unit 150, search unit 160 and database 170 included in the provider 140 of FIG. 1. The provider 240 additionally includes an output unit 280. Further, the subscription device 210 of FIG. 2 also stores the resource 132, pin 192' and extension value 296', similar to the subscription device 110 of FIG. 1.

The output unit 280 may include, for example, a hardware device including electronic circuitry for implementing the functionality described below, such as control logic and/or memory. In addition or as an alternative, the output unit 280 may be implemented as a series of instructions or microcode encoded on a machine-readable storage medium and executable by a processor.

In FIG. 2, the subscription device 210 and provider 240 may interact similarly to the subscription device 110 and provider 140 of FIG. 1. Further, the output unit 280 of the provider 240 is to output the credit 290 to the subscription device 210 via the network connection. The output unit 280 may include a network interface card (NIC) (not shown). While FIG. 2 only shows a single credit 290, the output unit 280 may output a plurality of credits 290 over a life of the subscription.

The sequence number 298' is locally retrieved by the user 120 from the subscription device 210. For example, the user may physically read the sequence number 298' off a display (not shown) of the subscription device 210 or communicate with the subscription device 210 to receive the sequence number 298, such as via Bluetooth. The extension value 296' is retrieved by the subscription device 210 from an extension field 296 included in the credit 290. Similarly, the resource 132, the pin 192 and the sequence number 298, and a subscription total 294 are retrieved from the credit 290 by the subscription device 210.

The subscription device 210 is to store the pin value 192', the extension value 296' and the sequence number 298' of the last received credit 290 of the plurality of credits 290, as these values may change from credit 290 to credit 290 for security and/or integrity purposes. For example, the output unit 280 may calculate the sequence number 298 and the pin 192 to be different for each of the plurality of credits 290. The output unit 280 may also output the pin and sequence number of the credit 290 to the database 170 so that the database 170 may update the pin and sequence number to be associated with ID number.

The user unit 150 is to output the pin to the user via a different, separate connection than the network connection of the subscription device 210, as explained above. The user unit 150 is to also receive the ID number and sequence number via the separate connection if the subscription device 210 is out of credits 290 and unable to receive additional credits 290 from the output unit 280 via the network connection.

The credit 290 is shown to include a resource field indicating the subscription total 294. The subscription total 294 is to increase over a life of a subscription, as explained above. For example, the subscription total 294 may be 100 for an initial credit 290, 200 for a subsequent credit 290, and so on. The subscription device 210 includes a counter 212 to add an amount of the resource 132 used by the subscription device 210 to a device total 214. The device total 214 may not resettable by the user 120, in order to reduce a likelihood of tampering.

The counter 212 may be any type of device which stores a number of times a particular event or process has occurred. For example, the device total 214 may be 500 if the user 120 has printed 500 pages thus far over the life of the subscription. If the user 120 then prints 50 more pages, the counter 212 may add 50 to the device total 214 such that the device total 214 is now 550. While the counter 212 and the device total 214 are shown separately, the device total 214 may be included in the counter 212. For example, the counter 212 may be a 32-bit counter that only counts upward and cannot be reset.

The subscription device 210 is only allowed to use the resource 132 if the subscription total 294' is greater than the device total 214. In one embodiment, the counter 212 may count the resource 132 before it is consumed by the subscription device 210, such as by counting all the pages to be used for a spooled document. In this case, if the device total 214 would exceed the subscription total 294', subscription device 210 will not print the document. In another embodiment, the counter 212 may count the resource after it is consumed by the subscription device 210, such as by individually counting every page of a document after it is printed. In this case, subscription device 210 may not finish printing the document, if the device total 214 reaches the subscription total 294' in the midst of printing the document.

The device total 214 may reach the subscription total 294' when, for example, the user 120 seeks to use more resources than which the user's subscription allots or if the subscription device 210 stops receiving credits 290, such as due to network connection issues. However, in embodiments, the user 120 may still be able to additionally use the resource 132 up to an amount indicated by the extension value 296, if the user 120 enters the pin into the subscription device 210 and the entered pin matches the stored pin 192', as described above.

Thus, the extension value 296 defines an amount of the resource 132 that the subscription device 210 can use after the device total 132 reaches the subscription total 214. Yet, the subscription device 210 may not use the resource 132 after both the extension value 296' is reached and the device total 214 reaches the subscription total 294'. For example, the subscription total 294' at a given time may be 500 pages, the device total 214 may also reach 500 pages, the extension value 296' may be 50 pages, and the stored pin 192' may be 5656. In this case, the user 120 may be able to still print 50 more pages from the subscription device 210 even though the device total 214 is already 500 pages, if the user correctly enters the pin "5656" into the subscription device 210. However, the device total 214 may not exceed 550 pages, unless a new credit 290 is received providing at least a higher subscription total 294. The pin may be entered into the subscription via, for example, a keypad.

The credit 290 or at least part of the credit 290 may include a digital signature to ensure its authenticity. For example, the subscription total 294 and the extension value 296 included in the credit 290 may be encrypted via an asymmetric key algorithm or hardware security module (HSM)-backed key pair.

The output unit 280 is to provide a plurality of the credits 290 over a time period to the subscription device 210 via the network connection according to a subscription plan of the user. For example, the output unit 280 may output a credit 290 every month over a 1, 2 or 5 year subscription plan. The subscription device 210 may only receive the credits 290 via the network connection. The output unit 280 may to calculate the extension value 296 to vary throughout the plurality of credits 290 based on at least one factor 282.

For instance, the factor 282 may be based on a number of resource units of the subscription plan. For example, the extension value 296 may be a percentage, such as 10%, of the number of monthly resource units provided. In this case, if the number of resource units is 500 pages a month, then the extension value 296 may be 50 pages. In another instance, the factor 282 may be based on a number of months the user has maintained an active and paid subscription. For example, if the extension value 296 is initially 50, then for every month the user 120 maintains an active and paid subscription, a loyalty value, such as 5, may be added to the extension value 296. In this case, the extension value 296 may be 100 after 10 months of maintaining an active and paid subscription.

In yet another instance, the factor 282 may be based on a number of times the user 120 has lost a connection with the output unit 280. For example, if the subscription device 210 is frequently losing the network connection with the output unit 290, the likelihood of packets or credits 290 being dropped may be higher. This may result in the device total 214 prematurely reaching the subscription total 294' because an actual subscription total 294 being sent out by the provider 240 is higher than the subscription total 294' stored at the subscription device 210. In this case, the extension value 296 may be set higher when there are a greater number of loss connections.

In still another instance, the factor 282 may be based on a use history of the user 120. For example, the provider 240 may know that the user 120 generally uses more resources certain months of the year. Thus, the output unit 280 may provide a higher extension value 296 during those months. In another instance, the factor 282 may be based on the device total 214. For example, the subscription device 210 may output the device total 214 to the user unit 150 and/or output unit 280 periodically via the network connection. In turn, the output unit 280 may proportionally increase the extension value 296 as the device total 214 reaches closer to the subscription total 294, in order to reduce the likelihood that the user 120 is prevented from using the resource 132. Any of the above factors may be used singly or in combination to determine the extension value 296.

The output unit 280 may also reduce the extension value 296, lockout the user 120 and/or cancel the subscription plan altogether (and thus stop sending credits 290) if a security breach is suspected. For example, the output unit 280 may take one of the above actions if the user 120 repeatedly enters an incorrect pin into the subscription device 210 beyond a first threshold number of times, such as ten continuous incorrect entries, and/or the user 120 repeatedly submits ID numbers and sequence numbers to the user unit 150 that do not match, beyond a second threshold number of times, such as ten continuous incorrect combinations. Further, the output unit 280 may also take one of the above actions if the user 120 invokes use of the resources 132 via the extension value 196' beyond a third threshold number of times, such as more than three times within a month.

Figure 3:
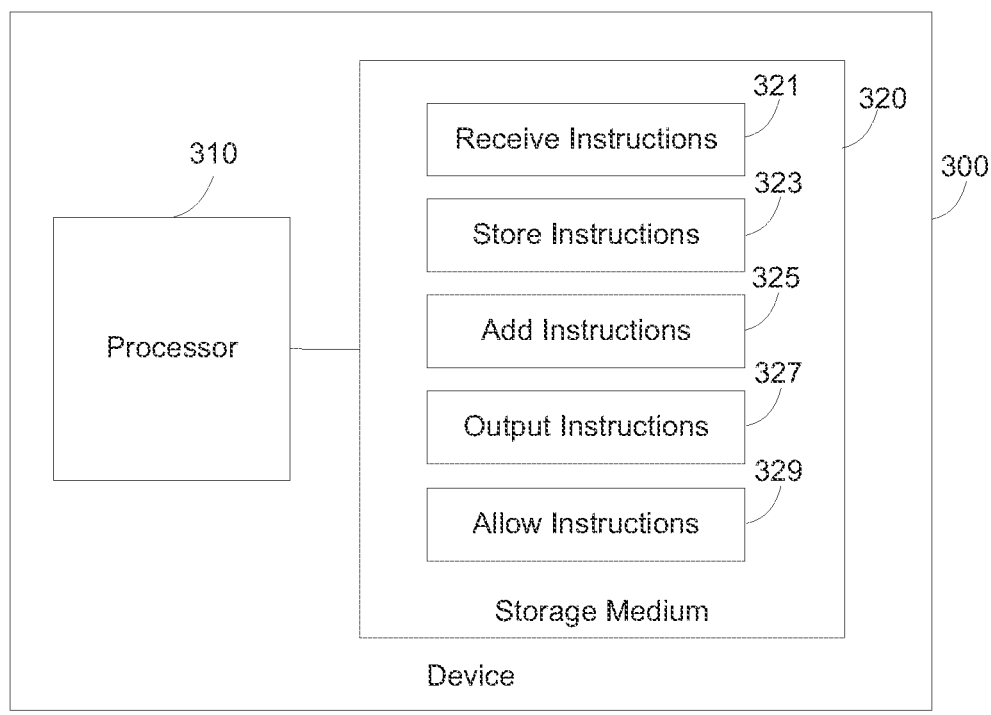
FIG. 3 is an example block diagram of a computing device including instructions for allowing a subscription device to use a resource up to an extension value.

FIG. 3 is an example block diagram of a computing device 300 including instructions for allowing a subscription device to use a resource up to an extension value. In the embodiment of FIG. 3, the computing device 300 includes a processor 310 and a machine-readable storage medium 320. The machine-readable storage medium 320 further includes instructions 321, 323, 325, 327 and 329 for allowing a subscription device (not shown) to use a resource up to an extension value.

The computing device 300 may be, for example, a printer, a mobile device, a fax machine, multimedia device, a secure microprocessor, a notebook computer, a desktop computer, an all-in-one system, a server, a network device, a controller, a wireless device, or any other type of device capable of executing the instructions 321, 323, 325, 327 and 329. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 321, 323, 325, 327 and 329 to implement allowing the subscription device to use the resource up to the extension value. As an alternative or in addition to retrieving and executing instructions, the processor 310 may include at least one integrated circuit (IC), other control logic, other electronic circuits, or combinations thereof that include a number of electronic components for performing the functionality of instructions 321, 323, 325, 327 and 329.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for allowing the subscription device to use the resource up to the extension value.

Figure 4:
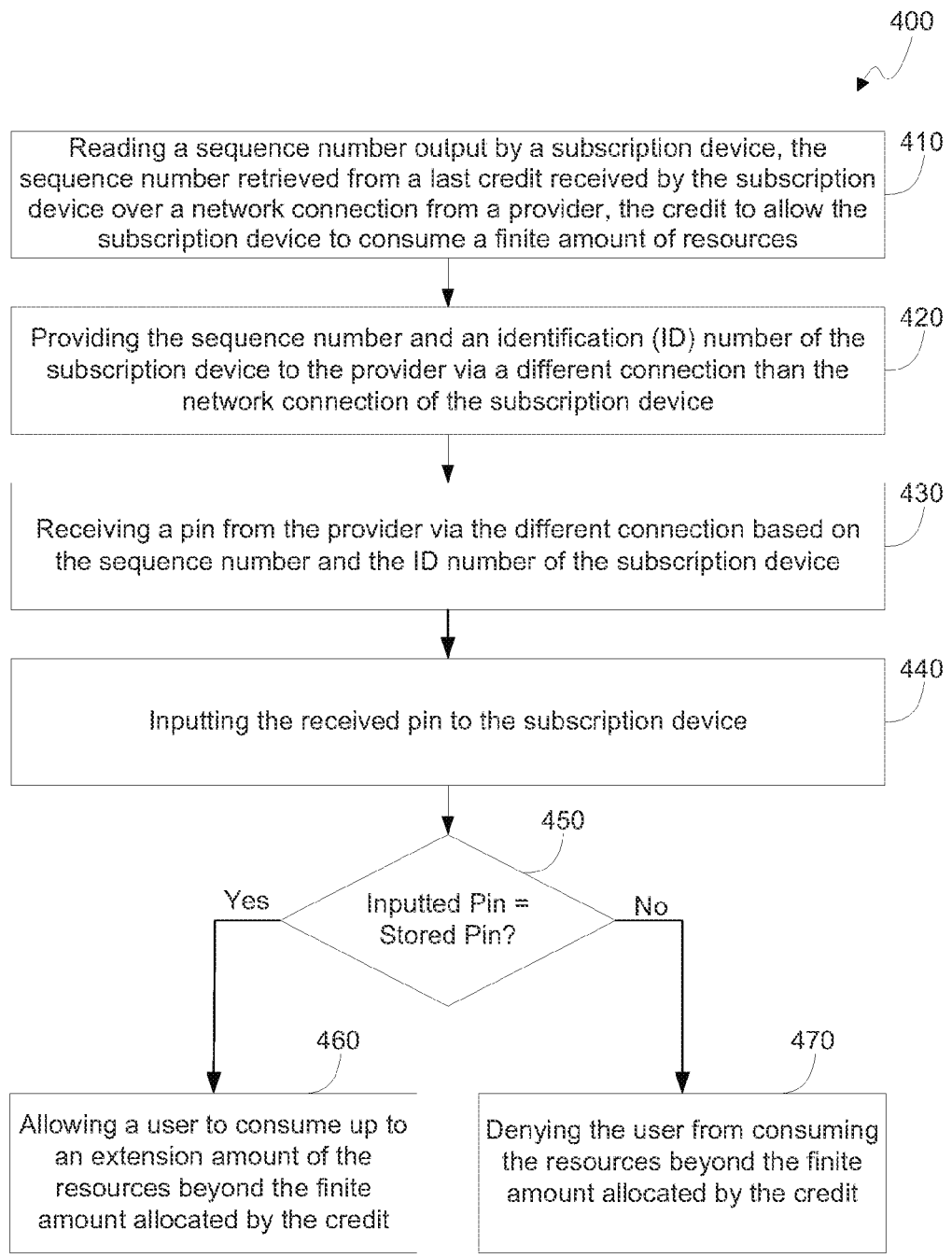
FIG. 4 is an example flowchart of a method for allowing a subscription device to use a resource up to an extension value.

Moreover, the instructions 321, 323, 325, 327 and 329 when executed by a processor (e.g., via one processing element or multiple processing elements of the processor) can cause the processor to perform processes, such as, the process of FIG. 4. For example, the receive instructions 321 may be executed by the processor 310 to receive, at the subscription device, a credit over a network connection from a provider (not shown). The store instructions 323 may be executed by the processor 310 to store, at the subscription device, a sequence number, an extension value, a subscription total and a pin retrieved from the credit. The add instructions 325 may be executed by the processor 310 to add to a device total, stored at the subscription device, an amount of resources the subscription device consumes.

The output instructions 327 may be executed by the processor 310 to output the sequence number only to a local user. The user is to use the sequence number to retrieve a pin from the provider via a connection different than the network connection of the subscription device. The allow instructions 329 may be executed by the processor 310 to allow the user to use up to the extension value amount of the resources, if the device total reaches the subscription total and the received pin matches the stored pin. The user cannot further use the resources via the subscription device after the device total reaches the subscription total and the extension value amount of the resources is consumed.

FIG. 4 is an example flowchart of a method 400 for allowing a subscription device to use a resource up to an extension value. Although execution of the method 400 is described below with reference to the system 200, other suitable components for execution of the method 400 can be utilized, such as the system 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the user 120 reads a sequence number 298' output by a subscription device 210. The sequence number 298' being retrieved from a last credit 294 received by the subscription device 210 over a network connection from a provider 240. The credit 294 allows the subscription device 210 to consume a finite amount of resources (e.g. subscription total 294). Then, at block 420, the user provides the sequence number 298' and an identification (ID) number of the subscription device to the provider 240 via a different connection than the network connection of the subscription device 210.

Next, at block 430, the user 120 receives a pin from the provider 240 via the different connection based on the sequence number 298' and the ID number of the subscription device 210. At block 440, the user 120 inputs the received pin to the subscription device 210. The subscription device 210 compares the inputted pin to a stored pin 192'. If the inputted pin correlates to the stored pin 192' of the subscription device 210, the subscription device 210 allows the user 120 to consume up to an extension amount 296' of the resources 132 beyond the finite amount 294' allocated by the credit 290, at block 460. Otherwise, if the inputted pin does not correlate to the stored pin 192' of the subscription device 210, the subscription device 210 denies the user 120 from consuming the resources 132 beyond the finite amount 294' allocated by the credit 290, at block 470.

The subscription device 210 is to receive a plurality of the credits 290 from the provider 240 over a life of a subscription. The stored pin 192' and the extension amount 296' is retrieved by the subscription device 210 from the last credit 290 of the plurality of credits 290 received by the subscription device 210. The stored pin 192', the extension amount 296' and the sequence number 298' are to vary throughout the plurality of credits 290. Further, the subscription device 210 maintains a device total 214 indicating a total amount of the resources 132 used over a life of the subscription. The finite amount 294' (e.g. subscription total 294') indicated by the credit 290 may increase over the life of the subscription. The subscription device 210 is allowed to consume the resources 132 if the finite amount 294' indicated by the credit 290 is greater than the device total 214. The extension amount 296' of the resources 132 is available to consume only after the device total 214 equals the finite amount 294' indicated by the credit 290.

According to the foregoing, embodiments provide a method and/or device for allowing for a subscription device, such as a printer, to consume a resource, such as printer pages, beyond its subscribed limit, when there is a network issue, while maintaining security. For example, in the event that the subscription device is unable to receive additional credits due to network issues and the subscription device has already maxed out the resources allotted by the previously received one or more credits, embodiments provide an alternate mechanism for the user to be allotted additional resources in a secure, fast, cost-effective and easy manner.

We claim:
1. A subscription system, comprising:
one or more processors; and
one or more memory resources storing instructions that, when executed by the one or more processors, cause the subscription system to:

receive an identification number (ID) and a sequence number, the ID number corresponding to a subscription device and the sequence number corresponding to a credit last received by the subscription device, wherein the credit indicates a subscription limit of a utilized resource met by the subscription device;

search a database to locate a pin associated with the ID number and the sequence number; and in response to locating the pin, transmit an additional credit to the subscription device to enable the subscription device to utilize the resource up to an extension amount above the subscription limit;

wherein the resource corresponds to one of a number of pages printed, an amount of ink consumed, a usage time, or a number of access events on the subscription device, and wherein the subscription limit and the extension amount are encrypted via an asymmetric key algorithm in the last received credit and the additional credit respectively.

2. The system of claim 1, wherein the extension amount is embedded in an extension field included in the additional credit.

3. The system of claim 2, wherein the ID number and the sequence number are received over a first network connection, and wherein the subscription system transmits the additional credit to the subscription device over a second network connection.

4. The system of claim 3, wherein the instructions, when executed by the one or more processors, further cause the subscription system to:

provide a plurality of credits over a time period to the subscription device via the second network connection according to a subscription plan; and set a variable extension amount for each of the plurality of credits based on one or more factors.

5. The system of claim 4, wherein the one or more factors correspond to at least one of a number of resource units of the subscription plan, a time period in which the subscription plan has been maintained, a number of times a connection with the subscription system has been lost, a use history of a user associated with the subscription plan, and a resource total of the subscription device.

6. The system of claim 4, wherein the instructions, when executed by the one or more processors, further cause the subscription system to:

(i) reduce the extension amount, (ii) lock out a user associated with the subscription plan, or (iii) cancel the subscription plan if the user (i) enters the pin incorrectly beyond a first threshold number of times, (ii) invokes use of the resource via the extension amount beyond a second threshold number of times, or (iii) submits ID numbers and sequence numbers that do not match beyond a third threshold number of times.

7. The system of claim 4, wherein the instructions, when executed by the one or more processors, further cause the subscription system to:

calculate the sequence number to be different for each of the plurality of credits;

wherein the subscription device is to store the extension value and the sequence number of a last received credit of the plurality of credits.

8. A non-transitory computer-readable storage medium storing instructions that, when executed by a processor of a subscription device, cause the subscription device to:

based on one or more events, suspend resource usage and display a sequence number corresponding to a last received credit;

receive an additional credit over a network connection from a provider, the additional credit indicating an extension amount of resources to be utilized by the subscription device;

based on the additional credit, add the extension amount of resources to a subscription limit, of a user subscription, indicated in the last received credit.

9. The non-transitory computer-readable storage medium of claim 8, wherein the one or more events include a loss of a network connection.

10. The non-transitory computer-readable medium of claim 8, wherein the one or more events include the subscription device reaching the subscription limit, based on the user subscription, and indicated in the last received credit.

11. A subscription device comprising:

one or more processors; and one or more memory resources storing instructions that, when executed by the one or more processors, cause the subscription device to perform operations comprising:

based on one or more events, suspend resource usage and display a sequence number corresponding to a last received credit;

receive an additional credit over a network connection from a provider, the additional credit indicating an extension amount of resources to be utilized by the subscription device;

based on the additional credit, add the extension amount of resources to a subscription limit, of a user subscription, indicated in the last received credit.

12. The subscription device of claim 11, wherein the one or more events include a loss of a network connection.

13. The subscription device of claim 11, wherein the one or more events include the subscription device reaching the subscription limit, based on the user subscription, and indicated in the last received credit.

* * * * *